(12) United States Patent
Sakatani

(10) Patent No.: US 9,086,563 B2
(45) Date of Patent: Jul. 21, 2015

(54) IMAGE PICKUP APPARATUS

(71) Applicant: Olympus Imaging Corp., Shibuya-ku, Tokyo (JP)

(72) Inventor: Koji Sakatani, Hachioji (JP)

(73) Assignee: OLYMPUS IMAGING CORP., Tokyo (JP)

( * ) Notice: Subject to any disclaimer, the term of this patent is extended or adjusted under 35 U.S.C. 154(b) by 153 days.

(21) Appl. No.: 14/025,201

(22) Filed: Sep. 12, 2013

(65) Prior Publication Data

US 2014/0009831 A1 Jan. 9, 2014

Related U.S. Application Data

(63) Continuation of application No. 13/171,886, filed on Jun. 29, 2011, now Pat. No. 8,684,543.

(30) Foreign Application Priority Data

Aug. 30, 2010 (JP) .................................. 2010-192731

(51) Int. Cl.
*G02B 27/00* (2006.01)
*G03B 11/00* (2006.01)
*G03B 17/14* (2006.01)
(Continued)

(52) U.S. Cl.
CPC ............ *G02B 27/0006* (2013.01); *G03B 11/00* (2013.01); *G03B 17/14* (2013.01); *H04N 5/2171* (2013.01); *H04N 5/2251* (2013.01); *H04N 5/2254* (2013.01)

(58) Field of Classification Search
CPC .... G02B 27/0006; G03B 11/00; G03B 17/14; H04N 5/2171; H04N 5/2251; H04N 5/2254
USPC .......... 359/507, 508, 513; 396/355, 357, 439, 396/449–462, 471, 483–501
See application file for complete search history.

(56) References Cited

U.S. PATENT DOCUMENTS

| 2,439,087 A | 4/1948 | Harvey |
| 7,006,138 B2 | 2/2006 | Kawai |

(Continued)

FOREIGN PATENT DOCUMENTS

| JP | 2002-090842 A | 3/2002 |
| JP | 2002-204379 A | 7/2002 |

(Continued)

OTHER PUBLICATIONS

Chinese Office Action dated Sep. 18, 2013 issued in counterpart Chinese Application No. 201110138714.5.

*Primary Examiner* — Frank Font
(74) *Attorney, Agent, or Firm* — Holtz, Holtz, Goodman & Chick PC

(57) ABSTRACT

An image pickup apparatus includes an image pickup unit, a shutter unit located at a front surface at a subject side of the image pickup unit, a first optical member disposed at a subject side of the shutter unit, and preventing dust particles from entering the shutter unit, a second optical member disposed at the image pickup unit side of the shutter unit, and preventing dust particles from entering the shutter unit, and a vibration applying vibration member disposed on at least one of the first optical member and the second optical member, and vibrating the first optical member or the second optical member at a position outside a region where a subject light transmits.

8 Claims, 14 Drawing Sheets

(51) Int. Cl.
*H04N 5/217* (2011.01)
*H04N 5/225* (2006.01)

(56) References Cited

U.S. PATENT DOCUMENTS

| | | |
|---|---|---|
| 7,580,628 B2 | 8/2009 | Ide et al. |
| 7,645,079 B2 | 1/2010 | Inukai et al. |
| 7,778,542 B2 | 8/2010 | Oshima |
| 7,946,773 B2 | 5/2011 | Matsumoto |
| 8,041,208 B2 | 10/2011 | Seita |
| 8,086,098 B2 | 12/2011 | Tanaka |
| 8,366,330 B2 | 2/2013 | Noto |
| 2007/0122147 A1 | 5/2007 | Hung |
| 2010/0158501 A1 | 6/2010 | Kawai |
| 2012/0287317 A1* | 11/2012 | Tobinaga et al. ............ 348/294 |
| 2013/0221200 A1* | 8/2013 | Watanabe ................. 250/208.1 |

FOREIGN PATENT DOCUMENTS

| | | |
|---|---|---|
| JP | 2002-348397 A | 12/2003 |
| JP | 2003-348397 A | 12/2003 |
| JP | 2010-160257 A | 7/2010 |
| JP | 2010-171939 A | 8/2010 |

* cited by examiner

IMAGE PICKUP APPARATUS

CROSS REFERENCE TO RELATED APPLICATIONS

This is a Continuation of U.S. application Ser. No. 13/171,886, filed Jun. 29, 2011, which claims the benefit of priority from Japanese Application No. 2010-192731, filed in Japan on Aug. 30, 2010, the contents of both of which are incorporated herein by reference.

BACKGROUND OF THE INVENTION

1. Field of the Invention

The present invention relates to an image pickup apparatus, and more particularly to an image pickup apparatus which has a dustproof function and is of an image pickup lens interchangeable type.

2. Description of the Related Art

Conventionally, image pickup apparatuses such as a digital camera and a video camera (hereinafter, generically called cameras) have been generally commercialized and widely used, which sequentially convert optical images formed by photographing optical systems into image signals by photoelectric conversion elements and the like (hereinafter, simply called image pickup devices and the like) such as solid-state image pickup devices, can record the image signals obtained thereby in recording media as image data in a predetermined mode, and are configured by including image display apparatuses such as liquid crystal display apparatuses (LCD) which reproduce and display the image data recorded in the recording media as images.

Further, in this kind of camera, a so-called taking lens interchangeable camera has been commercialized for a long time, which is configured such that the taking lens unit including a photographing optical system is configured to be attachable to and detachable from a camera main body, and is enabled to be used by being replaced with a taking lens unit having a desired kind (angle of view or the like) of photographing optical system in accordance with necessity.

A taking lens interchangeable type camera of such a mode has a high possibility that microscopic dust particles and the like adhere to a light receiving surface of, for example, an image pickup device or the like, or the surface of an optical element and the like which are provided at a front surface side of the image pickup device and the like when the taking lens unit is dismounted from the camera main body. If the use of the camera is continued while dust particles and the like are in the state adhering to the above described light receiving surface or the surface of the optical element, there arises the possibility that, for example, a light incident on the inside of the camera main body through the taking lens is blocked by the above described dust particles and the like. In this case, a pixel portion of the image pickup device or the like corresponding to the spot where the dust particles and the like adhere cannot normally receive an incident light. Accordingly, this causes a problem that a correct image signal cannot be outputted, a dot and the like such as a black point or a stain are formed, and image quality is degraded.

Thus, in the conventional cameras, various contrivances for inhibiting dust particles and the like from adhering to the light receiving surfaces of an image pickup device and the like or the surfaces of an optical element and the like which are provided at the front surface side of the image pickup device and the like are disclosed by, for example, Japanese Patent Application Laid-Open Publication No. 2002-090842, Japanese Patent Application Laid-Open Publication No. 2002-204379, Japanese Patent Application Laid-Open Publication No. 2003-348397 and the like, and are commercialized.

The camera disclosed in the above described Japanese Patent Application Laid-Open Publication No. 2002-090842 is the one in which a protective glass is disposed at a front surface side (lens side, a site near a subject) before a shutter curtain, and a space between the protective glass and the front surface of the image pickup device or the like is formed to be of a sealed structure, whereby disposition is achieved, which inhibits dust particles and the like from adhering to the light receiving surface of the image pickup device and the like, or the optical element at the front surface side of the image pickup device or the like, and enables easy cleaning of the dust particles and the like adhering to the outer surface of the protective glass.

Further, the cameras disclosed in the above described Japanese Patent Application Laid-Open Publication No. 2002-204379 and Japanese Patent Application Laid-Open Publication No. 2003-348397 are the ones in which the optical elements are disposed at the front surfaces of the image pickup devices, the spaces between the optical elements and the image pickup device front surface are formed to be of sealed structures, and vibration applying apparatuses which vibrate the above described optical elements by using vibration applying members are included, whereby the dust particles and the like which adhere to the surfaces of the optical elements are positively removed.

SUMMARY OF THE INVENTION

An image pickup apparatus according to the present invention includes an image pickup unit, a shutter unit located at a front surface at a subject side of the image pickup unit, a first optical member disposed at a subject side of the shutter unit, and preventing dust particles from entering the shutter unit, a second optical member disposed at a side of the image pickup unit of the shutter unit, and preventing dust particles from entering the shutter unit, and a vibration applying vibration member disposed on at least one of the first optical member and the second optical member, and vibrating the first optical member or the second optical member at a position outside a region where a subject light transmits.

The advantages of the present invention should become even more apparent from the following detailed description.

DETAILED DESCRIPTION OF THE PREFERRED EMBODIMENTS

Figure 1:
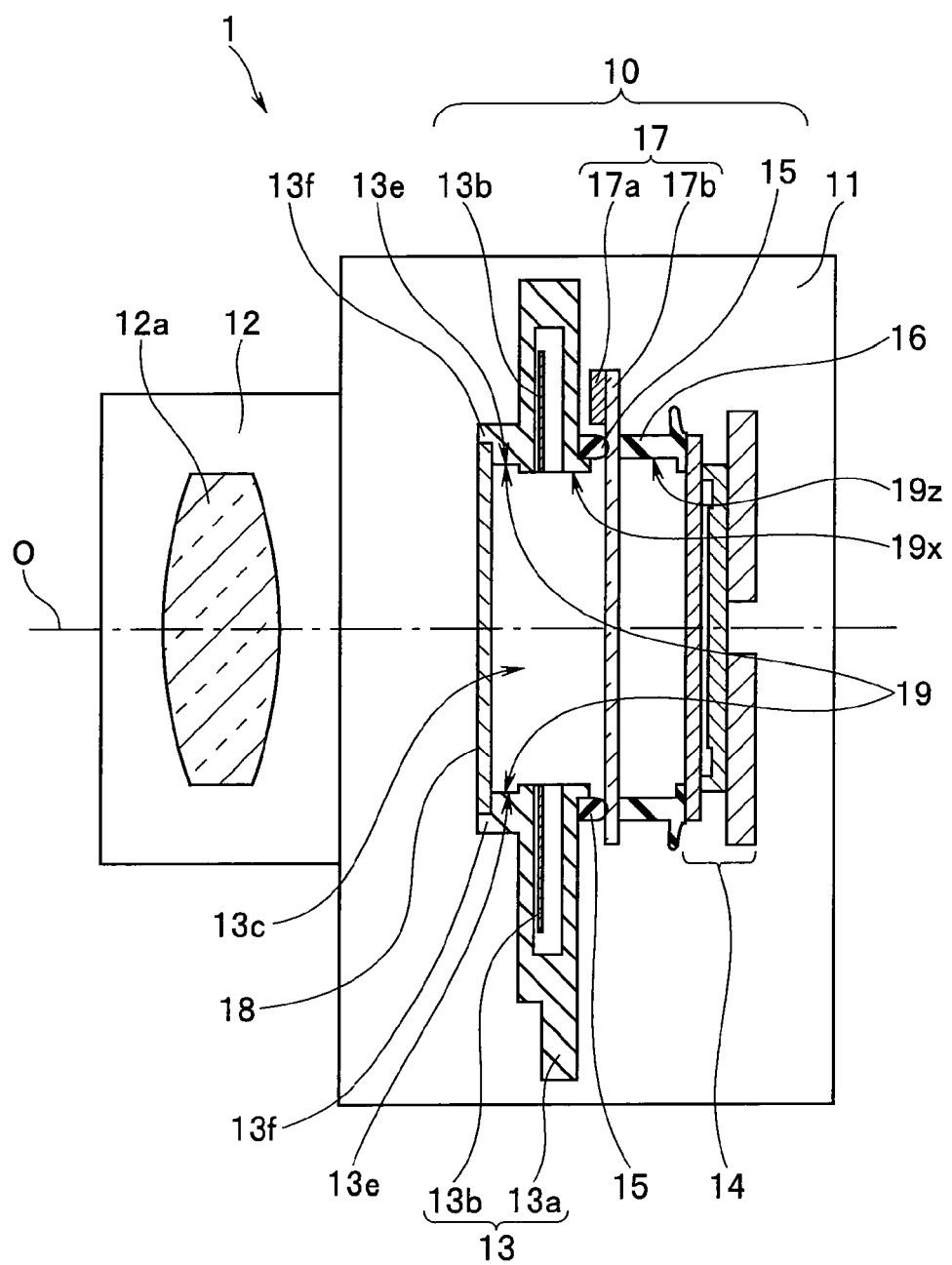
FIG. 1 is a schematic configuration view showing a main configuration according to the present invention in an image pickup apparatus of a first embodiment of the present invention.
Figure 2:
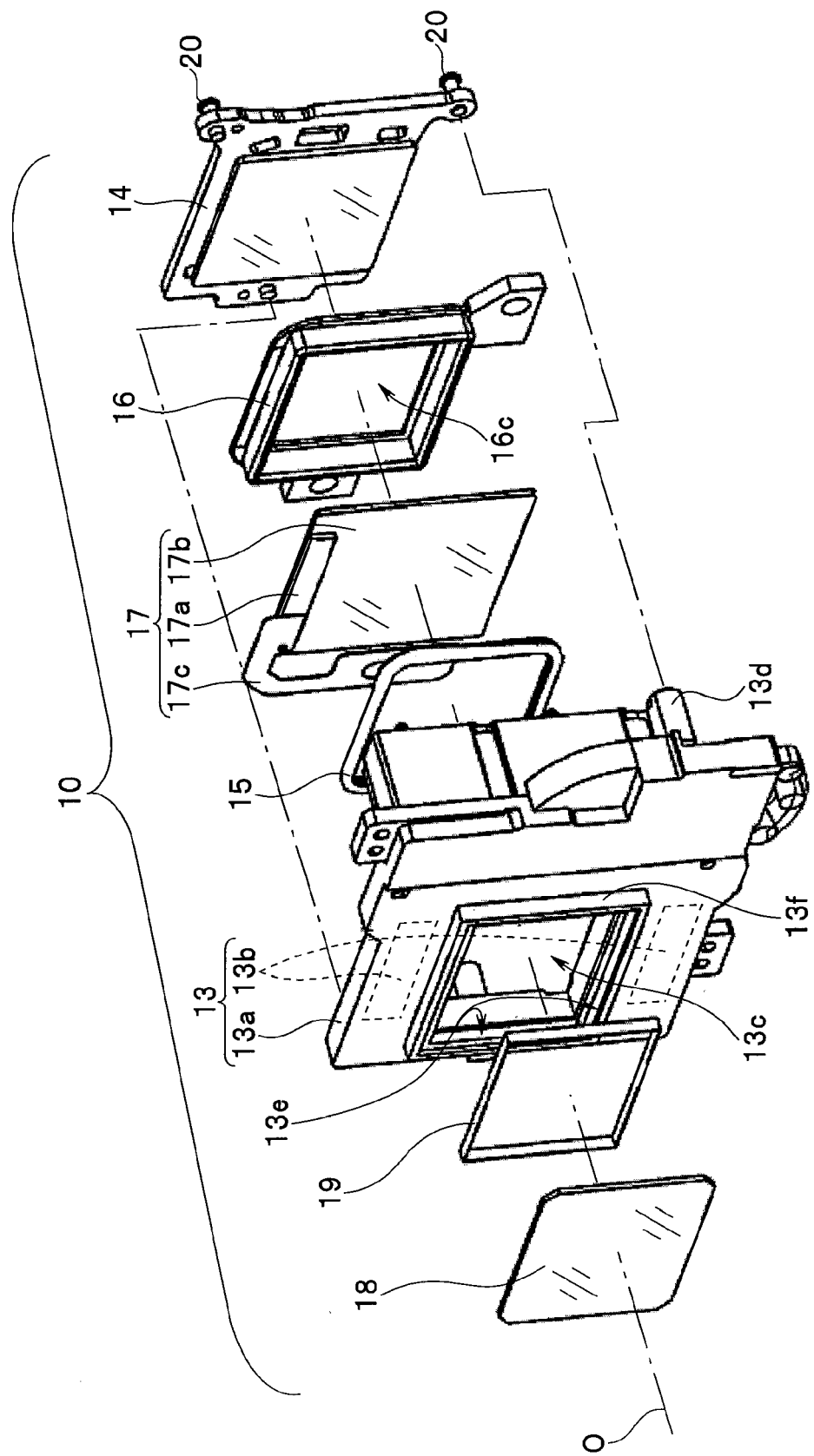
FIG. 2 is an exploded perspective view seen from a front surface side of main component units according to the present invention taken out, in the image pickup apparatus of FIG. 1.

The respective embodiments of the present invention which will be described hereinafter are various instances in the case of being applied to an image pickup apparatus such as a digital camera and a video camera (hereinafter, generically called a camera) which sequentially converts an optical image formed by, for example, a photographing optical system into an image signal by a photoelectric conversion device and the like (hereinafter, simply called an image pickup device and the like) such as a solid-state image pickup device, can record the image signal obtained thereby in a recording medium as image data in a predetermined mode, and is configured by including an image display apparatus such as a liquid crystal display apparatus (LCD) which reproduces and displays the image data recorded in the recording medium as an image, as an image pickup apparatus to which the present invention is applied.

In the present embodiment, a surface opposed to a subject at the time of use of a camera is called a front surface of the camera. A surface opposed to a user at the time of use of the camera is called a rear surface of the camera. Further, a surface at a side opposed to a sky at the time of use of the camera is called a top surface. A surface opposed to the top surface of the camera is called a bottom surface. Further, surfaces disposed at both sides in an ordinary use state of the camera are called a left side surface and a right side surface. As discrimination of the left and the right in this case, a left side or a right side when seen from a subject side toward the front surface of the camera is determined respectively as left or right.

Further, in each of the embodiments, an optical axis of a photographing optical system (taking lens) in a taking lens unit is expressed by a reference character O. In a direction along the optical axis O, a side where a subject which is opposed to the front surface of the camera is present is called a front side, and a side where an image pickup device which is disposed at a site near the rear surface of the camera is present is called a rear side.

In each of the drawings for use in the following description, in order to make each of components large enough to be recognizable on the drawings, each of the components is sometimes shown different scales according to each of the components. Accordingly, in the present invention, the numbers and quantities of the components, the shapes of the components, the ratios of the sizes of the components and the relative positional relations of the respective components which are illustrated in these drawings are not limited only to the illustrated modes.

First Embodiment

FIGS. 1 to 6 are views showing a first embodiment of the present invention. First, a schematic configuration of a camera 1 which is an image pickup apparatus of the first embodiment of the present invention will be described hereinafter with use of FIG. 1.

The camera 1 of the present embodiment is a taking lens interchangeable type camera, and is a so-called mirrorless camera of a mode in which a finder optical system internally including a reflection mirror and the like is omitted. This kind of camera is configured to guide a subject luminous flux which transmits through a taking lens unit 12 to be incident directly to an image pickup device of an image pickup unit 14, output an image signal generated based on an output signal of the image pickup device to a display apparatus and use a display image thereof as an image for observation.

The camera 1 is mainly configured by a camera main body 11 having various component units inside, and the taking lens unit 12 which is fitted to the front surface of the camera main body 11.

The taking lens unit 12 is configured by having component members such as a plurality of frame members which hold a taking lens 12a, a drive member, a drive motor and the like which drive the plurality of frame members though not illustrated in the drawing, in addition to the taking lens 12a including a plurality of optical lenses and the like. The taking lens unit 12 is configured by having, for example, an attaching and detaching mechanism of a bayonet type or the like so as to be attachable to and detachable from the camera main body 11. As the taking lens unit 12 itself, the one with an ordinary configuration which is applied in a conventional lens interchangeable type camera or the like is applied.

Various component units are provided inside the camera main body 11. Of the various component units, the component unit according to the present invention is a dust reduction system unit 10 which is configured by a shutter unit 13, an image pickup unit 14, a vibration applying unit 17 and the like. Accordingly, in the following description and drawings, only the detailed configuration and illustration relating to the dust reduction system unit 10 are mainly described, and as to the other component units of the camera main body 11, those similar to the conventional image pickup apparatus (camera) are applied, and therefore, the description and illustration of the other component units will be omitted.

Next, the detailed configuration of the dust reduction system unit 10 in the camera 1 of the present embodiment will be described as follows with use of FIGS. 1 to 6.

As described above, the dust reduction system unit 10 in the camera 1 of the present embodiment is mainly configured by the shutter unit 13, the image pickup unit 14, the vibration applying unit 17 and the like.

The shutter unit 13 is a mechanical type shutter unit which mechanically drives to open and close a shutter blade via a drive motor and a drive mechanism. Further, as for a shutter type of the shutter unit 13, the shutter unit is of a focal plane type which passes and blocks a photographing luminous flux which transmits through the taking lens unit 12 and incident on the image pickup unit by the shutter blade moving to open and close in a direction orthogonal to the optical axis O of the taking lens 12a at the front side of the image pickup unit 14. As the structure of the shutter unit 13 itself, the shutter unit of an ordinary structure, which is applied to the conventional image pickup apparatus (camera), is applied, and in the following description, the characteristic configuration according to the present invention will be described.

The shutter unit 13 which is applied to the camera 1 of the present embodiment is mainly configured by a shutter base plate 13a, a shutter blade 13b and the like.

The shutter base plate 13a is a member which is mounted with various component members configuring the shutter unit 13 and configures a main body portion of the shutter unit 13. The shutter base plate 13a includes components such as a shutter drive motor, and a shutter drive mechanism though not illustrated, in addition to the shutter blade 13b, for example.

A substantially rectangular opening 13c which can allow a luminous flux from a subject (hereinafter, simply called a subject luminous flux) which transmits through the taking lens 12a of the taking lens unit 12 which is fitted to the front surface of the camera 1 of the present embodiment is formed in a substantially central portion of the shutter base plate 13a.

The shutter blade 13b is a member for opening and closing the opening 13c at a predetermined timing (interlocked with a photographing operation). The shutter blade 13b is configured to be in a mode with a plurality of members each in the shape of a thin plate overlaid on one another. As for a configuration of the shutter blade 13b itself and means for opening and closing control thereof and the like, an ordinary configuration and means which are used in the conventional image pickup apparatus (camera) are applied.

A protection member 18 as a first optical member is disposed at a front surface side (subject side) of the shutter unit 13. For this purpose, a substantially rectangular frame portion 13f is formed at a front surface side of the shutter unit 13 to surround an outer peripheral edge portion of the above described opening 13c.

The protection member 18 which is the first optical member is held by the frame portion 13f. In this case, the protection member 18 is fixedly placed onto the frame portion 13f by fixing means such as bonding, for example. Thereby, a joint portion between the protection member 18 and the frame portion 13f of the shutter unit 13 is configured to keep a close contact state. Accordingly, in an inside of the shutter unit 13, an enclosed space to an outside is formed between a surface at a rear side of the protection member 18 and a front surface of a dust proof member 17b (details will be described later) of the vibration applying unit 17 disposed at a rear side thereof via the shutter blade 13b. By such a configuration, the protection member 18 as the first optical member plays a role of inhibiting dust particles and the like from entering the inside of the shutter unit 13.

The above described protection member 18 is formed by a transparent optical member so as to be able to transmit the subject luminous flux which transmits through the taking lens unit 12. As the protection member 18, a plate-shaped optical member or the like having an optical action such as an optical low pass filter, an infrared ray cut filter, a polarizing filter, and an optical lens can be applied, besides a protection plate member such as a transparent glass plate or a transparent resin plate simply for protection, for example. Further, surface treatment such as antistatic coating is applied at least to one of a front surface and a back surface of the protection member 18.

An adhesive member 19 is pasted along an inner edge portion 13e of the above described frame portion 13f of the shutter unit 13. The adhesive member 19 is a member which plays a role of adsorbing dust particles and the like so that the dust particles and the like are not suspended in the above described enclosed space in the shutter unit 13. For the adhesive member 19, a member which is formed to have adhesion on a surface, for example, a double-sided adhesive tape or the like is applied. In the present embodiment, the double-sided adhesive tape is provided at each side of the inner edge portion 13e, but apart from this, a mode may be adopted in which the inner edge portion 13e is coated with a member having adhesion, for example.

At a rear side of the shutter unit 13, the image pickup unit 14 is placed. The image pickup unit 14 is configured by having, for example, a solid-state image pickup device and the like (hereinafter, generically called an image pickup device) which is a photoelectric conversion element such as a back surface irradiation type CMOS (Complementary Metal Oxide Semiconductor) and a back surface irradiation type CCD (Charge Coupled Device).

The image pickup unit 14 is configured by including, for example, electronic circuit components and the like which form various processing circuits and the like which process output signals of a driver for an image pickup device and an image pickup device, and transmit the output signals to an internal control circuit, a signal processing circuit and the like in the camera main body 11, in addition to the above described image pickup device.

A light receiving surface of the image pickup device of the image pickup unit 14 is disposed to face forward of the camera 1 to be able to receive the subject luminous flux which passes through the taking lens unit 12 and is incident thereon. Further, the image pickup device is disposed in a predetermined position inside the camera main body 11 so that a substantially center position of the light receiving surface of the image pickup device substantially corresponds to an optical axis O of the above described taking lens 12a.

Figure 3:
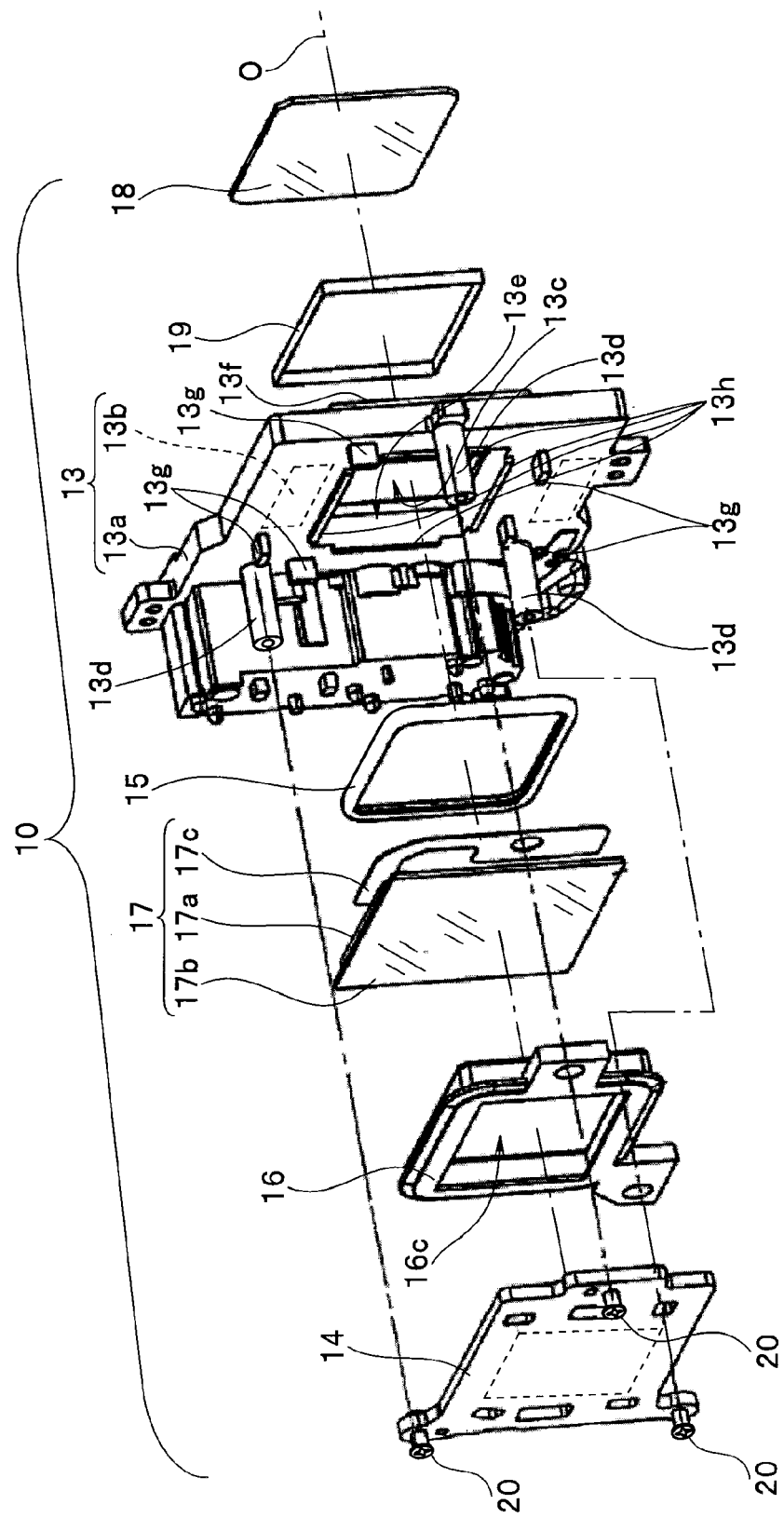
FIG. 3 is an exploded perspective view seen from a rear surface side of the main component units according to the present invention taken out, in the image pickup apparatus of FIG. 1.
Figure 4:
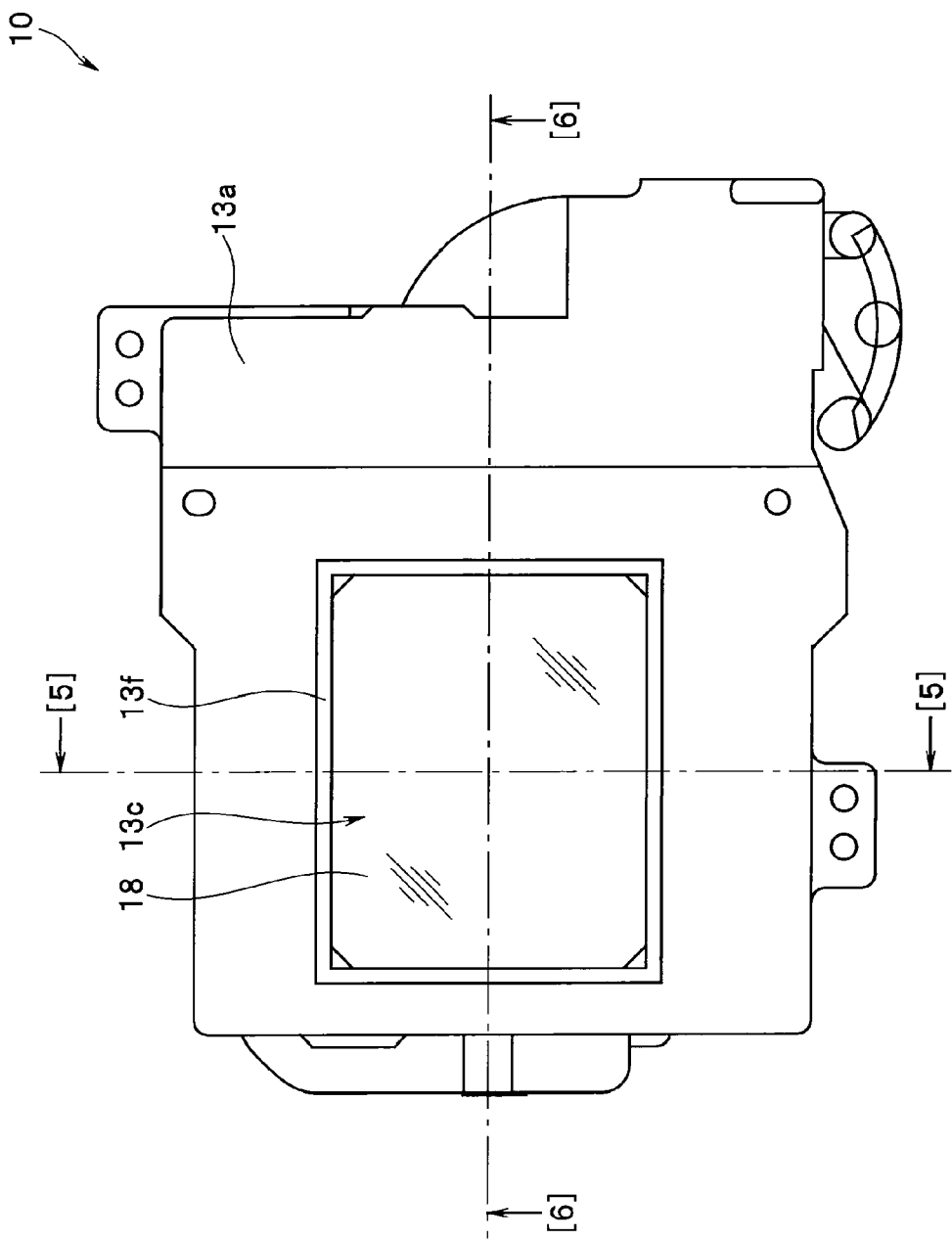
FIG. 4 is a plane view seen from the front surface side of the main component units according to the present invention taken out, in the image pickup apparatus of FIG. 1.
Figure 5:
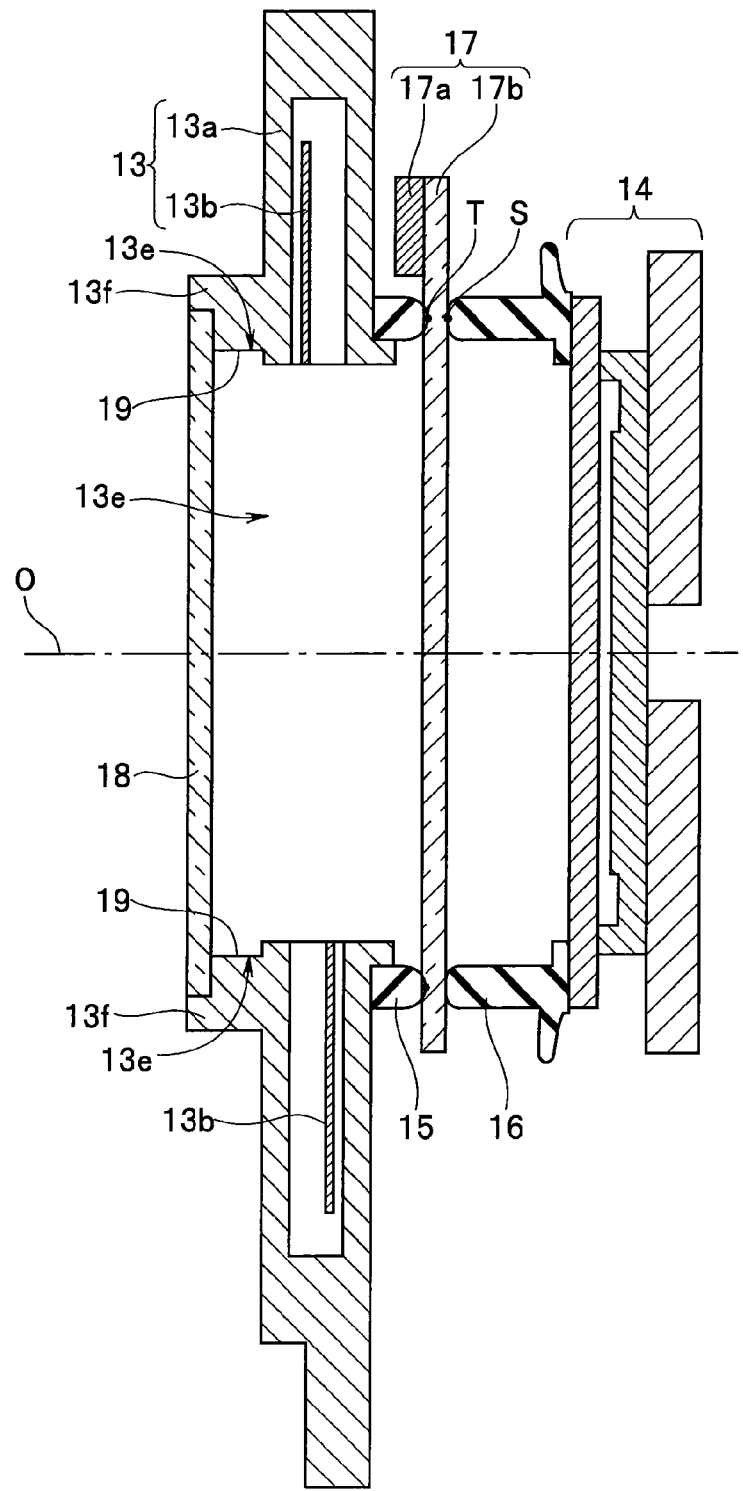
FIG. 5 is a sectional view taken along a line [5]-[5] of FIG. 4.
Figure 6:
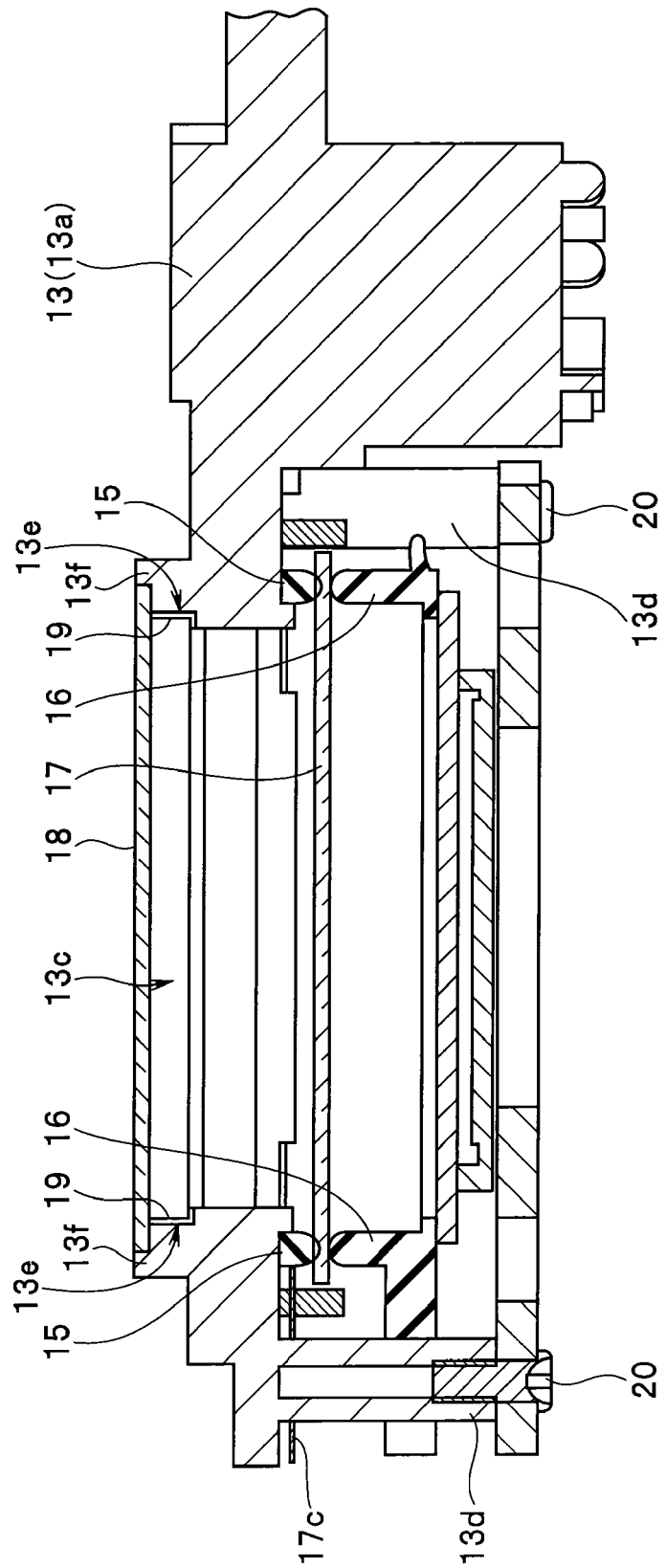
FIG. 6 is a sectional view taken along a line [6]-[6] of FIG. 4.

The image pickup unit 14 is screwed and fixed by using screws 20 in a predetermined site at a rear surface side of the above described shutter unit 13. For this purpose, a plurality (three in the present embodiment) of mounting bosses 13d are implanted on the rear surface side of the shutter unit 13 to project toward a rear surface in the direction along the optical axis O as shown in FIG. 3.

When the image pickup unit 14 is brought into a state in which the image pickup unit 14 is screwed and fixed to the shutter unit 13 here, a first elastic member 15, the vibration applying unit 17 and a second elastic member 16 are placed in the sequence from the front side in the mode of being sandwiched between both of them.

The first elastic member 15 is formed by a member having elasticity such as a rubber member which is formed into a rectangular ring shape in substantially the same shape and the same size in accordance with the shape of the opening 13c of the shutter unit 13. The first elastic member 15 is fixedly supported at the rear surface side of the shutter unit 13. Therefore, wall-shaped support portions 13h which are formed to surround an outer peripheral edge portion along the respective sides of the above described opening 13c is provided at the rear surface side of the shutter unit 13. The first elastic member 15 is disposed to surround an outer peripheries of the above described support portions 13h. The first elastic member 15 is fixed to the rear surface of the shutter unit 13 by means such as bonding in the site. The first elastic member 15 may be directly bonded to the rear surface of the shutter unit 13 without the wall-shaped support portions 13h being provided.

At the rear side of the shutter unit 13, the vibration applying unit 17 is placed with the above described first elastic member 15 therebetween. The vibration applying unit 17 is configured by the dust proof member 17b as the second optical member, a vibration applying vibration member 17a, an electric board 17c and the like.

The dust proof member 17b which is the second optical member is a member which is disposed at the rear side of the shutter unit 13, that is, at the side of the image pickup unit 14, and plays a role of preventing dust particles and the like from entering the shutter unit 13.

For this purpose, the dust proof member 17b is placed to be in close contact with the above described first elastic member 15 in a predetermined position in the vicinity of the outer peripheral edge portion thereof. The dust proof member 17b is formed by a transparent optical member so as to be able to pass the subject luminous flux which passes through the taking lens unit 12 substantially similarly to the above described protection member 18. For the dust proof member 17b, a plate-shaped optical member and the like, which have an optical action such as an optical low pass filter, an infrared ray cut filter, a polarizing filter and an optical lens, besides a plate-shaped member for protection such as a transparent glass plate or a transparent resin plate simply for protection, for example, can be applied similarly to the above described protection member 18. Further, surface treatment such as antistatic coating is applied to at least one of the front surface and the back surface of the dust proof member 17b.

By such a configuration, inside the shutter unit 13, an enclosed space which is enclosed to the outside is formed between the front surface of the dust proof member 17b of the vibration applying unit 17 and the surface at the rear side of the above described protection member 18 which is disposed at the front side thereof via the shutter blade 13b as described above.

The vibration applying vibration member 17a is a member which vibrates the dust proof member 17b, and is placed at a predetermined site in the vicinity of the outer peripheral edge portion of the dust proof member 17b, for example, a position outside a region where a subject luminous flux transmits in the dust proof member 17b, that is, a site at which the vibration member 17a does not inhibit transmission of the subject luminous flux. Here, as shown in FIG. 1 and the like, in the present embodiment, an example in which one vibration applying vibration member 17a is provided at a site along one side of the outer peripheral edges (four sides) of the dust proof member 17b. The number of vibration applying vibration members 17a which are placed is not limited to only one as in the example, but may be provided respectively at sites along the respective opposed two sides of the outer peripheral edges (four sides) of the dust proof member 17b, for example.

The electric board 17c as electric connection means is connected to the vibration applying vibration member 17a for supplying electric power for driving the vibration applying vibration member 17a, and for transmitting a control signal from the control circuit of the camera 1. The electric board 17c is formed by, for example, a flexible printed circuit board and the like. As for a configuration of the vibration applying unit 17 itself, the configuration similar to the one that has been already generally commercialized conventionally is applied.

As described above, the above described first elastic member 15 is sandwiched between the rear surface of the shutter unit 13 and the dust proof member 17b of the above described vibration applying unit 17. In this case, a site where the first elastic member 15 and the front surface of the dust proof member 17b abut on each other is a site where transmission of the subject luminous flux is not inhibited, and is in the vicinity to the outer peripheral edge portion of the dust proof member 17b. Further, in the vicinity (site shown by reference character T of FIG. 5 in the present embodiment) where the vibration applying vibration member 17a is provided out of the site where the first elastic member 15 and the front surface of the dust proof member 17b abut on each other, the first elastic member 15 is set to abut on the front surface of the dust proof member 17b at a position nearer to the optical axis O than the position where the vibration applying vibration member 17a is disposed. In other words, the vibration applying vibration member 17a is placed at the outer edge side compared to the abutment site of the first elastic member 15 and the front surface of the dust proof member 17b.

Accordingly, the vibration applying unit 17 drives the vibration applying vibration member 17a to vibrate the dust proof member 17b, whereby the vibration applying unit 17 can remove the dust particles and the like which are generated from, for example, the shutter blade 13b or the like and adhere to the front surface of the dust proof member 17b. The dust particles and the like which are removed from the surface of the dust proof member 17b is adsorbed by the above described adhesive member 19 without being suspended in the above described enclosed space in the shutter unit 13.

The second elastic member 16 is placed at the rear side of the vibration applying unit 17. The second elastic member 16 is formed by having an opening 16c in substantially the same shape and the same size in accordance with the shape of the opening 13c of the above described shutter unit 13. As the second elastic member 16, a member having elasticity such as a rubber member, for example, is applied similarly to the above described first elastic member 15. The second elastic member 16 is fixedly supported at the front surface side of the image pickup unit 14. In this case, the opening 16c is set to be larger than the image pickup device light receiving surface of the image pickup unit 14. The above described opening 16c is formed to have a sufficient opening area so that the second elastic member 16 does not hinder the above described subject luminous flux in the state in which the second elastic member 16 is fixed to the image pickup unit 14 by an adhesive or the like.

The image pickup unit 14 with the second elastic member 16 fixed to the front surface thereof is screwed and fixed to the rear surface of the above described shutter unit 13 in the state in which the image pickup unit 14 sandwiches the above described vibration applying unit 17 therebetween as described above. In this case, a site where the rear surface of the dust proof member 17b of the vibration applying unit 17 and the second elastic member 16 abut on each other is set to be at the position (opposing position; the site shown by reference character S of FIG. 5 in the present embodiment) facing to the site where the above described first elastic member 15 and the dust proof member 17b abut on each other.

As described above, the dust proof member 17b of the vibration applying unit 17 is disposed in the mode in which the dust proof member 17b is sandwiched between the first elastic member 15 which is fixed to the rear surface side of the shutter unit 13 and the second elastic member 16 which is fixed to the front surface side of the image pickup unit 14.

In this state, the dust proof member 17b vibrates at a predetermined timing by an action of the vibration applying vibration member 17a. At this time, the dust proof member 17b vibrates with the abutment site of the first and the second elastic members 15 and 16 as a support point. By the vibration of the dust proof member 17b, the dust proof member 17b is likely to move in a direction (direction orthogonal to the optical axis O) along a plane of itself. Thus, a plurality of position restricting portions 13g for restricting plane movement when the vibration applying vibration member 17a is driven to vibrate the dust proof member 17b and the vibration applying unit 17 performs plane movement, are formed on the rear surface side of the shutter unit 13.

The plurality of position restricting portions 13g are provided to project in a direction along the optical axis O in a position on which the outer peripheral edge of the dust proof member 17b can abut when the vibration applying unit 17 performs plane movement, that is, in the vicinity of the outer peripheral edge portions of the four sides of the opening 13c.

By the above configuration, an enclosed space which is enclosed to the outside is formed between a surface at a rear side of the dust proof member 17b of the vibration applying unit 17 and the image pickup device light receiving surface of the image pickup unit 14. In this case, the image pickup unit 14 is screwed and fixed to the shutter unit 13. More specifically, in this state, the image pickup unit 14 is pressed and fixed to the shutter unit 13. Accordingly, the second elastic member 16 which is interposed between them is pressed and fixed toward the first elastic member 15.

As an elastic constant of the first elastic member 15, a member with an elastic constant larger than that of the second elastic member 16 is applied. This is a setting with consideration given to prevention of, for example, the shutter blade 13b from being in contact with the dust proof member 17b.

Further, the second elastic member 16 also plays a role of reducing transmission of a vibration which occurs when the shutter blade 13b drives, a vibration of the vibration applying unit 17 and the like to the image pickup unit 14 by being interposed between the dust proof member 17b and the front surface of the image pickup unit 14.

As described above, according to the above described first embodiment, the protection member 18 is disposed at the front surface side of the shutter unit 13, and the vibration applying unit 17 (dust proof member 17b) is disposed at the rear side, whereby the enclosed space is configured to be formed inside the shutter unit 13, and therefore, dust particles and the like from an outside can be inhibited from entering an inside of the shutter unit 13.

At the same time as above, the dust particles and the like which are generated from the shutter blade 13b and adhere to the surface of the dust proof member 17b can be removed by an action of the vibration applying unit 17, and further, the dust particles and the like which are removed by the vibration applying unit 17 are configured to be adsorbed by the adhesive member 19. Thereby, the influence can be removed, which is given to other structures such as the shutter blade 13b or an image obtained by the image pickup device by the dust particles and the like in the enclosed space inside the shutter unit 13.

Further, the protection member 18 is disposed at the front surface side of the shutter unit 13, and therefore, even when the taking lens unit 12 is in the state removed from the camera main body 11, the internal mechanism such as the shutter blade 13b is not brought into a state exposed to the outside. Accordingly, the internal mechanism such as the shutter blade 13b can be protected. At the same time as this, the dust particles and the like which adhere to an outer surface at a front surface side of the protection member 18 can be easily cleaned out with use of a blower, a cloth or the like.

Further, the protection member 18 at the front surface side of the shutter unit 13 is disposed at a long distance from the light receiving surface of the image pickup device. Accordingly, even if photographing is performed with dust particles and the like adhering to the outer surface at the front surface side of the protection member 18, the influence which the dust particles and the like have on an acquired image can be made small.

According to the present embodiment, the vibration applying unit 17 is disposed to be sandwiched by the first and the second elastic members 15 and 16, and the second elastic member 16 is pressed against the first elastic member 15 in this state, whereby the enclosed space at the front surface (the image pickup device light receiving surface) side of the image pickup unit 14 is configured to be securable while the vibration applying unit 17 is held. Accordingly, the component members are reduced as compared with the conventional means, the vibration applying unit is held with a simpler configuration, and a dust proof function can be reliably realized. This can contribute to miniaturization, weight reduction, and thickness reduction of the dust reduction system unit 10 and the camera 1 to which the dust reduction system unit 10 is applied, and can contribute to reduction in manufacturing cost at the same time.

In the present embodiment, an example is shown, in which the adhesive member 19 is placed at the portion forward of the shutter blade 13b in the inside of the shutter unit 13. However, disposition of the adhesive member 19 is not limited to the example, and the adhesive member 19 may be placed at another site.

For example, in place of, or in addition to the above described example, the adhesive member 19 may be provided at an inner surface portion (portion shown by reference symbol 19x of FIG. 1) or the like of a portion rearward of the shutter blade 13b inside the shutter unit 13. In addition, the adhesive member 19 may be provided at an inner surface portion (portion shown by reference symbol 19z of FIG. 1) or the like of the second elastic member 16.

Second Embodiment

In the aforementioned first embodiment, an example of application to a taking lens interchangeable type mirrorless camera is shown as the image pickup apparatus to which the present invention is applied.

Figure 7:
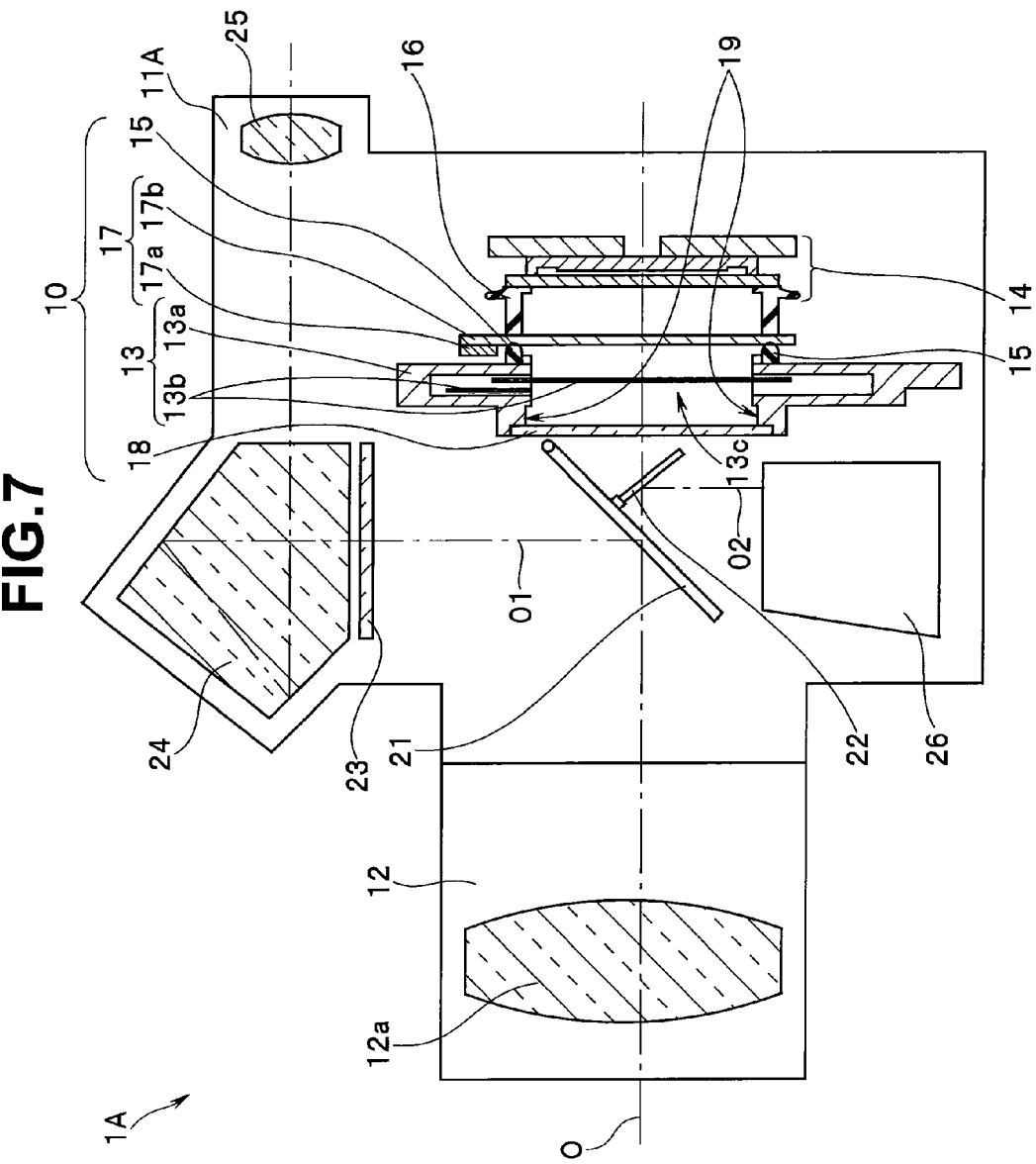
FIG. 7 is a schematic configuration view showing a main configuration according to the present invention, in an image pickup apparatus of a second embodiment of the present invention.
Figure 8:
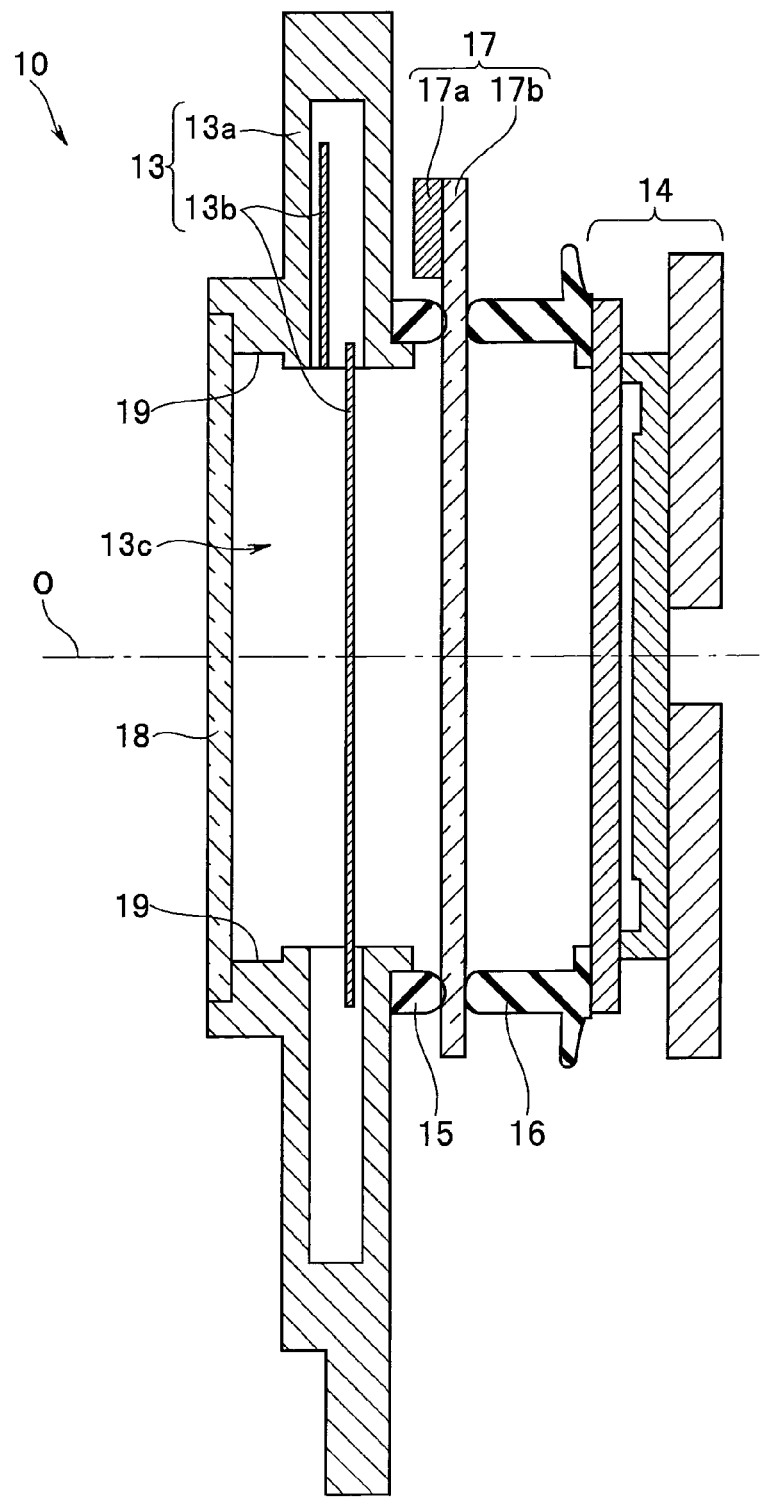
FIG. 8 is a sectional view of main component units in the image pickup apparatus of FIG. 7.

The configuration of the present invention can not only be applied to the image pickup apparatus of this kind of mode, but can also be applied to the image pickup device of another mode, for example, a taking lens interchangeable type single-lens reflex camera in totally the same manner. A second embodiment of the present invention which will be described next is an example of application to a taking lens interchangeable type single-lens reflex camera. A schematic configuration of a camera 1A of the present embodiment will be described hereinafter with use of FIG. 7.

The camera 1A of the present embodiment is a taking lens interchangeable type camera, and is a single-lens reflex camera of a mode having a finder optical system internally including a reflection mirror or the like. This kind of camera is configured to be able to realize a use mode of guiding a subject luminous flux which transmits through the taking lens unit 12 to be incident to a side of a finder optical system by using a reflection mirror 21 and observing the observation image, a use mode of retracting the reflection mirror 21 from the optical axis O to guide the above described subject luminous flux to the image pickup device of the image pickup unit 14 in a camera main body, and recording an image signal generated based on an output signal of the image pickup device, and in addition, a use mode of outputting an image signal based on the output signal of the image pickup device to a display apparatus and using a display image thereof as an image for observation.

The camera 1A is mainly configured by a camera main body 11A having various component units therein, and the taking lens unit 12 which is fitted to a front surface of the camera main body 11A.

The taking lens unit 12 is totally the same as that of the aforementioned first embodiment in the point that the taking lens unit 12 is configured to be attachable to and detachable from the camera main body 11A. As the taking lens unit 12 itself, the one with an ordinary configuration which is applied to the conventional lens interchangeable type camera or the like is applied.

Various component units are provided inside the camera main body 11A. Of various component units, component members such as the reflection mirror 21, a sub-mirror 22, a focusing screen 23, a pentagonal roof prism 24, a finder eyepiece lens 25, and an AF unit 26 are the component members peculiar to a single-lens reflex camera. These component members themselves are similar to those applied to a conventional ordinary single-lens reflex camera.

Meanwhile, in the camera 1A of the present embodiment, the component unit relating to the present invention is the dust reduction system unit 10 which is configured by the shutter unit 13, the image pickup unit 14, the vibration applying unit 17, the protection member 18, the first elastic member 15, the second elastic member 16 and the like. The configuration of the dust reduction system unit 10 itself is a configuration totally the same as that of the aforementioned first embodiment.

As the difference from the camera 1 of the aforementioned first embodiment, the following point is cited. More specifically, in the camera 1A of the present embodiment, a state in which the reflection mirror 21 is placed on the optical axis O (state shown in FIG. 7) is the use state of observing a subject image with use of the finder optical system.

In this state, a luminous reflux from a subject which transmits through the taking lens 12a of the taking lens unit 12 and is incident on an inside of the camera main body 11A along the optical axis O travels along an optical axis O1 with its optical axis bent toward a side of the upper finder optical system by the reflection mirror 21. Further, part of the subject luminous reflux which is incident on the inside of the camera main body 11A transmits through the reflection mirror 21, and travels to the sub-mirror 22 which is disposed at the rear side thereof and further travels to a side of the AF unit 26 at a lower side along an optical axis O2 with its optical axis bent by the sub-mirror 22.

In this state, the shutter blade 13b of the shutter unit 13 is in a closed state which blocks the opening 13c. In this point, the camera 1A of the present embodiment differs from the camera 1 of the aforementioned first embodiment.

In the camera 1A of the above described second embodiment which is configured as above, an effect totally the same as that of the aforementioned first embodiment can be obtained.

Third Embodiment

Next, a third embodiment of the present invention will be described hereinafter with use of FIGS. 9, 10 and 11.

A configuration of the present embodiment basically includes a configuration substantially similar to that of the aforementioned first embodiment. Briefly describing, the present embodiment differs in the point that the present embodiment is configured to have a mode in which disposition of the protection member 18 (as the first optical member) and disposition of the vibration applying unit 17 (including the second optical member) in the aforementioned first embodiment are replaced. Other components are the same as those of the aforementioned first embodiment, and in the following description, only the point different from the first embodiment will be described in detail. In FIGS. 9 to 11, only a dust reduction system unit of the present embodiment is illustrated, and illustration of the entire configuration of a camera and the other component members is omitted.

Figure 9:
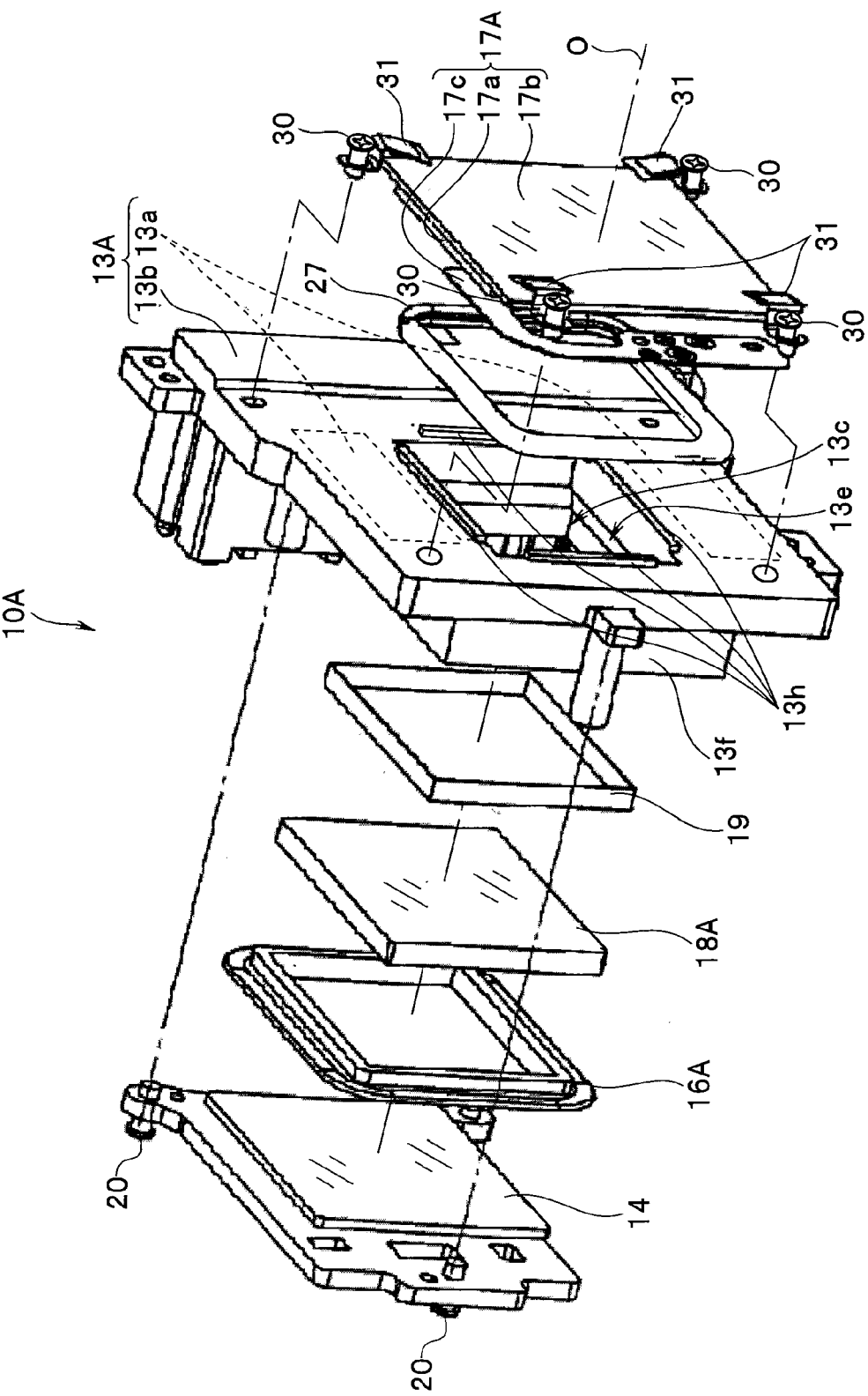
FIG. 9 is an exploded perspective view of main component units according to the present invention seen from a front surface side, in an image pickup apparatus of a third embodiment of the present invention.
Figure 10:
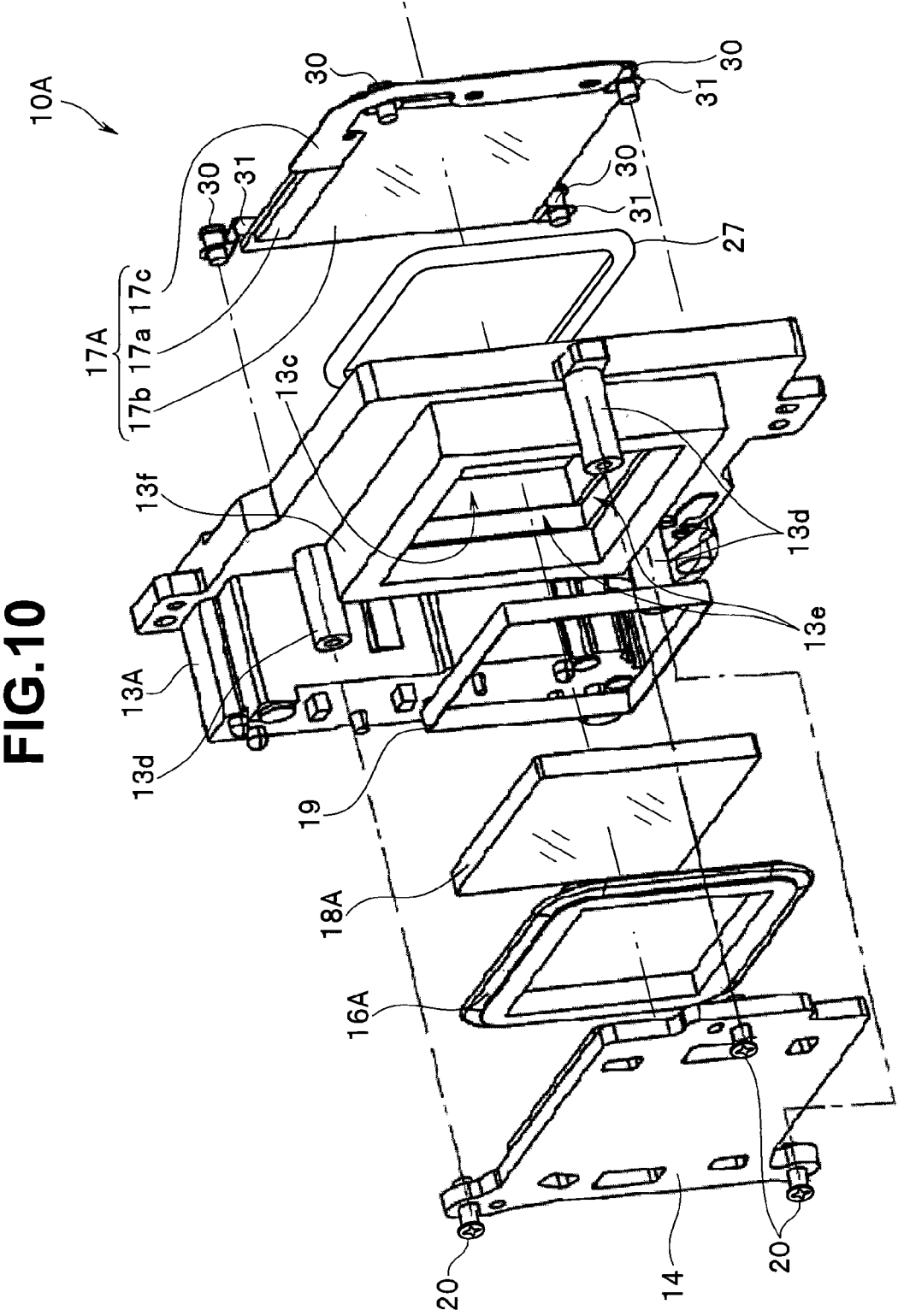
FIG. 10 is an exploded perspective view of the main component units of FIG. 9 seen from a rear surface side.
Figure 11:
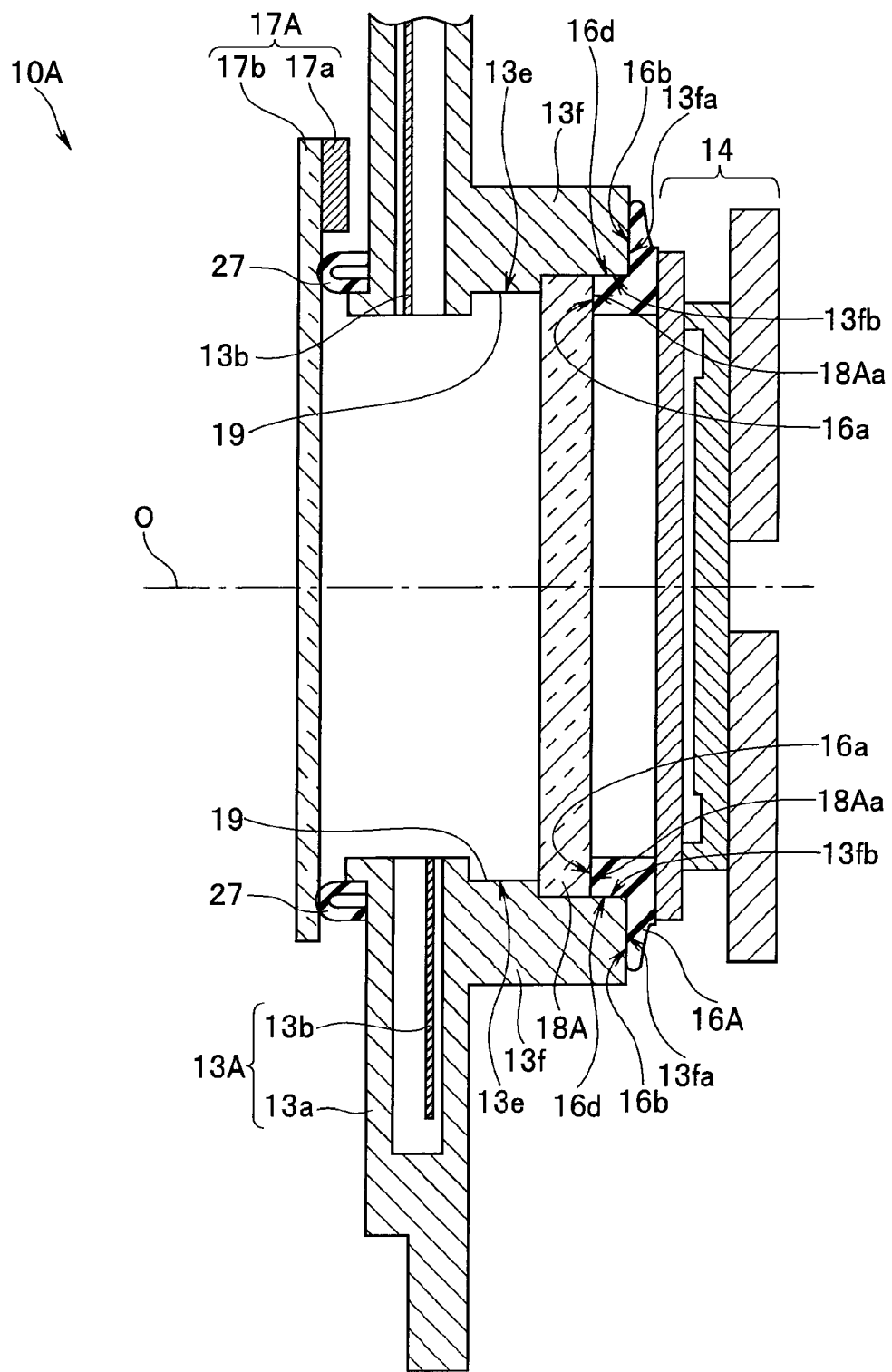
FIG. 11 is a sectional view of the main component units of FIG. 9.

A dust reduction system unit 10A in the camera of the present embodiment is configured by a vibration applying unit 17A, a third elastic member 27, a shutter unit 13A, a protection member 18A, a second elastic member 16A, the image pickup unit 14 and the like in the sequence from the front surface side as shown in FIGS. 9 to 11.

In the present embodiment, the vibration applying unit 17A is disposed at a front surface side of the shutter unit 13A. The vibration applying unit 17A is configured by the vibration applying vibration member 17a and the dust proof member 17b, and a basic configuration thereof is similar to that of the aforementioned first embodiment.

The vibration applying unit 17A in the present embodiment is screwed and fixed to the front surface side of the shutter unit 13A with use of screws 30. In this case, plate-shaped members 31 having elasticity are interposed between the screws 30 and the dust proof member 17b. The plate-shaped members 31 press a vicinity of an outer peripheral edge portion of the dust proof member 17b (for example, the vicinity of four corner portions of the dust proof member 17b) toward the front surface of the shutter unit 13A in a direction along the optical axis O. At the same time as this, the above described plate-shaped members 31 also play the role of restricting plane movement of the dust proof member 17b in a direction orthogonal to the optical axis O when the vibration applying unit 17A is driven.

In the present embodiment, the third elastic member 27 is sandwiched between the vibration applying unit 17A and the shutter unit 13A. The third elastic member 27 is formed by a member having elasticity such as a rubber member or the like which is formed in a rectangular ring shape in the substantially the same shape and the same size in accordance with the shape of the opening 13c of the shutter unit 13A similarly to the first elastic member 15 in the aforementioned first embodiment. The third elastic member 27 is fixedly supported at the front surface side of the shutter unit 13A unlike the aforementioned first embodiment. For this purpose, at the front surface side of the shutter unit 13A, wall-shaped support portions 13h which are formed to surround an outer peripheral edge portion are provided along respective sides of the above described opening 13c. The third elastic member 27 is disposed to surround an outer periphery of the above described support portions 13h. The third elastic member 27 is fixed to the front surface of the shutter unit 13A by means such as bonding in the site. More specifically, the first embodiment and the present embodiment differ from each other in the point that in the above described first embodiment, the configuration is such that the first elastic member 15 and the vibration applying unit 17 are disposed at the rear surface side of the shutter unit 13, whereas in the present embodiment, the configuration is such that the third elastic member 27 and the vibration applying unit 17A are disposed at the front surface side of the shutter unit 13A.

As described above, the third elastic member 27 is sandwiched between the front surface of the shutter unit 13A and the vibration applying unit 17A, and the above described vibration applying unit 17A is pressed toward the front surface of the shutter unit 13A by an action of the plate-shaped members 31. Accordingly, the dust proof member 17b is always in the state pressed toward the third elastic member 27, and even if the vibration applying unit 17A is driven and the dust proof member 17b is vibrated, the close contact state between the third elastic member 27 and the dust proof member 17b is always kept. Thereby, in the inside of the shutter unit 13A, an enclosed space to an outside is formed between the surface at the rear side of the dust proof member 17b and a front surface of the protection member 18A (details will be described later) which is disposed at a rear side thereof via the shutter blade 13b.

Meanwhile, in the present embodiment, the substantially rectangular frame portion 13f is formed at the rear surface side of the shutter unit 13A to surround the outer periphery edge portion of the opening 13c of the shutter unit 13A. The protection member 18A as the second optical member is fixedly held at the frame portion 13f. The configuration in which the protection member 18A is fixedly held by the frame portion 13f is similar to the configuration of the protection member 18 and the frame portion 13f in the aforementioned first embodiment. However, difference is in the point that the configuration is such that the protection member is held at the front side of the shutter unit 13 in the first embodiment.

The protection member 18A is provided fixedly to the frame portion 13f by fixing means such as bonding, for example. Thereby, a joint portion between the protection member 18A and the frame portion 13f of the shutter unit 13 is configured to keep a close contact state. Accordingly, inside the shutter unit 13A, an enclosed space to the outside is formed between the front surface of the protection member 18A and the rear surface of the dust proof member 17b (details will be described later) of the vibration applying unit 17A which is disposed at the front side thereof via the shutter blade 13b. By such a configuration, the protection member 18A as the second optical member plays the role of inhibiting dust particles and the like from entering the inside of the shutter unit 13. The protection member 18A is formed by the material and the mode similar to the protection member 18 of the aforementioned first embodiment.

The adhesive member 19 is pasted onto the inner edge portion 13e of the frame portion 13f of the shutter unit 13 along the inner edge portion 13e. For the adhesive member 19, the one of the same material and the same mode as the adhesive member 19 of the aforementioned first embodiment is applied. Thereby, the configuration is such that in the above described enclosed space in the shutter unit 13, dust particles and the like are not suspended.

The image pickup unit 14 is placed at a rear side of the shutter unit 13 via the second elastic member 16A. The configuration of the image pickup unit 14 itself is similar to that of the aforementioned first embodiment.

The image pickup unit 14 is screwed and fixed by screws 20 to a plurality (three in the present embodiment) of mounting bosses 13d (see FIG. 10) which are formed to project toward the rear surface in a direction along the optical axis O from the rear surface side of the shutter unit 13.

The second elastic member 16A is formed from a member having an opening in substantially the same shape and the same size in accordance with the shape of the opening 13c of the shutter unit 13A, and having elasticity such as a rubber member entirely formed in a rectangular ring shape. The second elastic member 16A is fixedly supported by the frame portion 13f of the shutter unit 13A. For this purpose, the second elastic member 16A is formed by having a front surface peripheral edge portion 16a which is formed by an outer peripheral surface 16d which is in contact with an inner peripheral surface 13fb of the inner peripheral edge portion of the frame portion 13f, and an outer peripheral edge portion 18Aa which is in contact with a rear surface of the protection member 18A, and a flange-shaped portion 16b which is disposed to abut on a rear surface edge portion 13fa of the frame portion 13f.

Thus, the second elastic member 16A is fixed by means such as bonding to the shutter unit 13A in the state abutting on the inner peripheral edge portion of the frame portion 13f and the rear surface edge portion 13fa as shown in FIG. 11. Accordingly, in the second elastic member 16A, a distal end edge portion of the front surface peripheral edge portion 16a abuts on and is in close contact with the outer peripheral edge portion 18Aa of the protection member 18A over the entire circumference, the outer peripheral surface 16d of the front surface peripheral edge portion 16a abuts on and is in close contact with the inner peripheral surface 13fb of the frame portion 13f over the entire circumference, and the flange-shaped portion 16b abuts on and is in close contact with the rear surface edge portion 13fa of the frame portion 13f over the entire circumference. The outer peripheral edge portion at the rear surface side of the second elastic member 16A is bonded and fixed to the outer peripheral edge portion of the image pickup unit 14 by means such as bonding.

By such a configuration, in the rear surface side of the shutter unit 13A, the enclosed space is formed between the rear surface of the protection member 18A which is the second optical member and the front surface of the image pickup unit 14, and the second elastic member 16A inhibits dust particles and the like from entering the inside of the enclosed space. Accordingly, the image pickup device light receiving surface of the image pickup unit 14 is always kept in a clean state.

In the above described third embodiment, the dust proof member 17b is disposed at the front surface side (subject side) of the shutter unit 13, and plays a role of preventing dust particles and the like from entering the inside of the shutter unit 13A. Accordingly, in the present embodiment, the dust proof member 17b corresponds to the first optical member.

Meanwhile, in the above described third embodiment, the protection member 18A is disposed at the rear side of the shutter unit 13A, that is, the side of the image pickup unit 14, and plays the role of preventing dust particles and the like from entering the shutter unit 13A. Accordingly, in the present embodiment, the protection member 18A corresponds to the second optical member.

As described above, according to the above described third embodiment, the effect similar to that of the aforementioned first embodiment can be obtained.

Fourth Embodiment

Next, a fourth embodiment of the present invention will be described hereinafter with use of FIGS. 12, 13 and 14.

A configuration of the present embodiment is made by combination of a part of the configuration of the aforementioned first embodiment and a part of the configuration of the aforementioned third embodiment. Briefly, the present embodiment configures a dust reduction system unit by combining the configuration at the rear side of the shutter unit 13 in the aforementioned first embodiment (the vibration applying unit, the image pickup unit), and the configuration at the front side of the shutter unit 13A in the aforementioned third embodiment (the vibration applying unit).

More specifically, the present embodiment differs only in the point that the vibration applying unit 17A (including the first optical member) in the aforementioned third embodiment is disposed in place of the protection member 18 as the first optical member in the aforementioned first embodiment.

In other words, the dust reduction system unit in the camera of the present embodiment adopts a mode in which vibration applying units (17A, 17) are provided at the front and the rear of a shutter unit 13B with the shutter unit 13B therebetween. Other components are similar to those of the aforementioned first embodiment. FIGS. 12 to 14 show only the dust reduction system unit of the present embodiment, and illustration of the entire configuration of the camera and the other component members is omitted.

Figure 12:
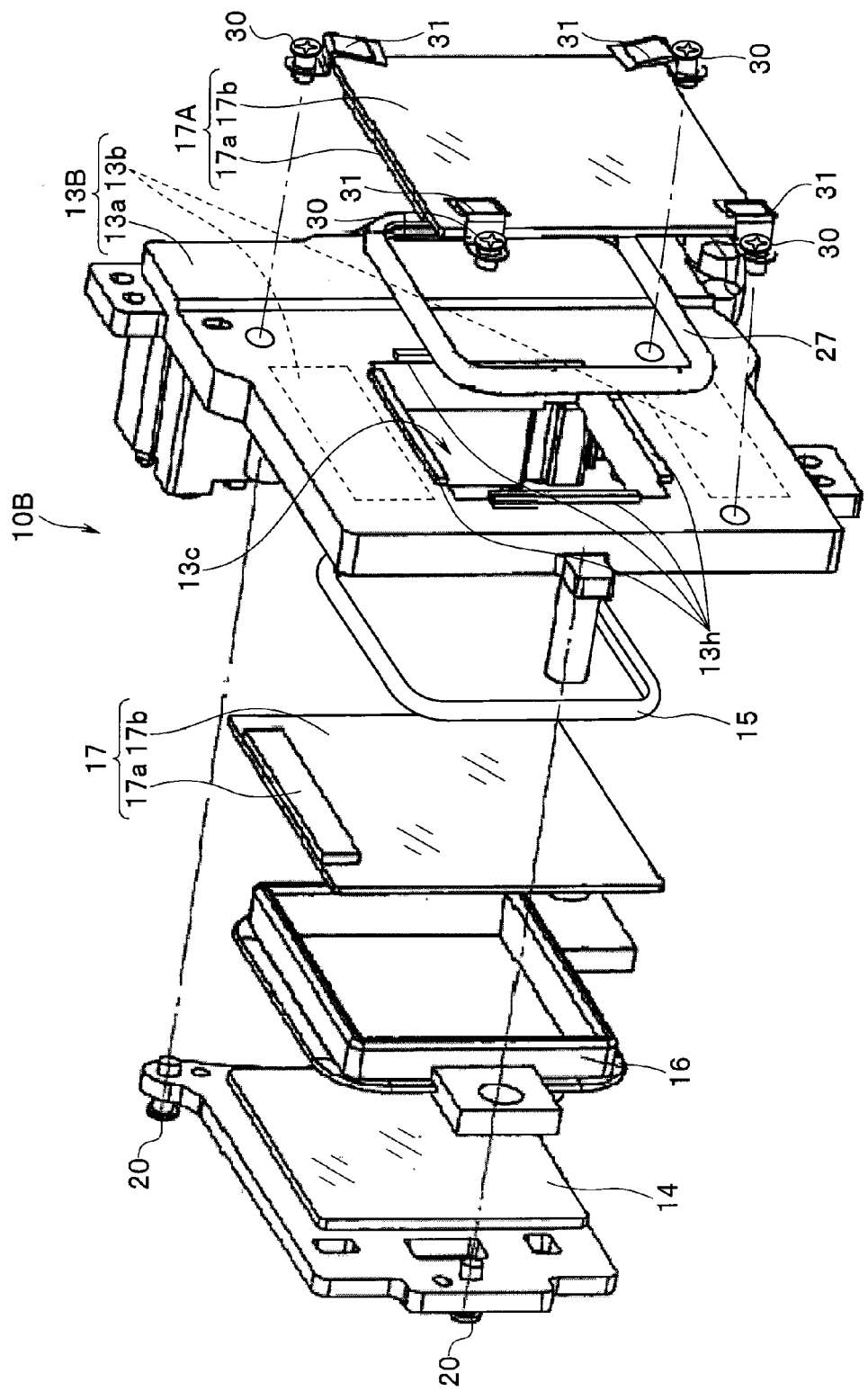
FIG. 12 is an exploded perspective view of main component units according to the present invention seen from a front surface side in an image pickup apparatus of a fourth embodiment of the present invention.
Figure 13:
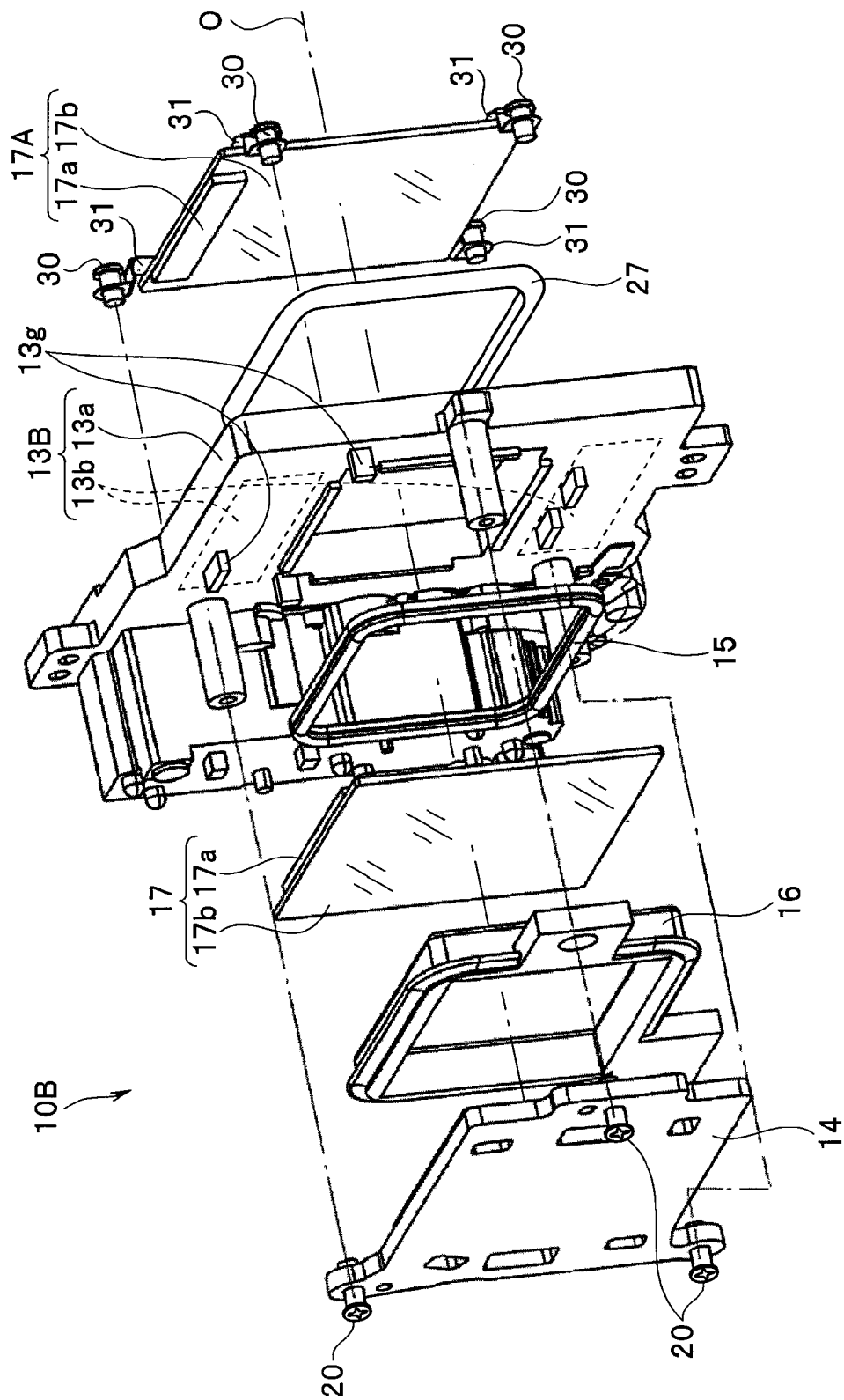
FIG. 13 is an exploded perspective view of the main component units of FIG. 12 seen from a rear surface side.
Figure 14:
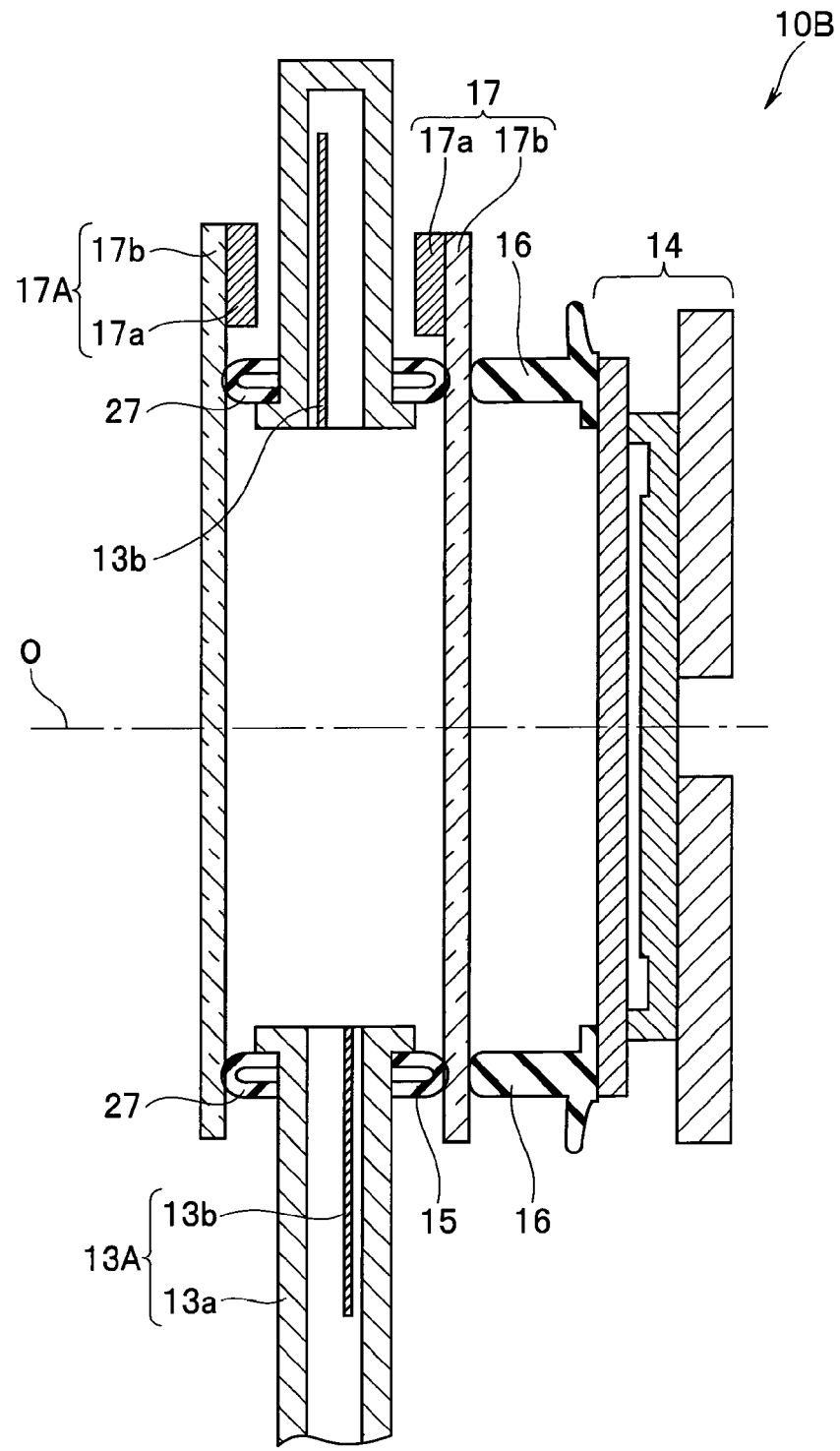
FIG. 14 is a sectional view of the main component units of FIG. 12.

A dust reduction system unit 10B in the camera of the present embodiment is configured by the first vibration applying unit 17A, the third elastic member 27, the shutter unit 13B, the first elastic member 15, the second vibration applying unit 17, the second elastic member 16, the image pickup unit 14 and the like in the sequence from the front surface side as shown in FIGS. 12 to 14.

At a front surface side of the shutter unit 13B, a first vibration applying unit 17A including a configuration totally the same as the vibration applying unit 17A in the aforementioned third embodiment is attached via the third elastic member 27 with similar means.

Meanwhile, at a rear surface side of the shutter unit 13B, a second vibration applying unit 17 including a configuration totally the same as the vibration applying unit 17 in the aforementioned first embodiment is attached via the first elastic member 15 with similar means, and further at a rear side thereof, the image pickup unit 14 is attached via the second elastic member 16 with similar means. Other components are substantially similar to those of the aforementioned first embodiment.

In the above described fourth embodiment, the dust proof member 17b of the first vibration applying unit 17A is disposed at the front surface side (subject side) of the shutter unit 13, and plays a role of preventing dust particles and the like from entering an inside of the shutter unit 13B. Accordingly, in the present embodiment, the dust proof member 17b of the first vibration applying unit 17A corresponds to the first optical member.

Meanwhile, in the above described fourth embodiment, the dust proof member 17b of the second vibration applying unit 17 is disposed at a rear side of the shutter unit 13B, that is, at the side of the image pickup unit 14, and plays a role of preventing dust particles and the like from entering the shutter unit 13B. Accordingly, in the present embodiment, the dust proof member 17b of the second vibration applying unit 17 corresponds to the second optical member.

As described above, according to the above described fourth embodiment, an effect similar to that of the aforementioned first embodiment can be obtained. In addition to this, in the present embodiment, the first and the second vibration applying units 17A and 17 are respectively provided at the front and the rear of the shutter unit 13B with the shutter unit 13B therebetween, and therefore, dust particles and the like can be removed more effectively.

In each of the aforementioned embodiments, the example of the case of configuration in which the first optical member and the second optical member are formed to be substantially rectangular, and the opening of the shutter unit, and the shapes of the first and second elastic members and the like are formed to be substantially rectangular in accordance with this is shown, but the shapes of the component members are not limited to the exemplification of each of the above described embodiments. For example, the present invention can be configured by forming the first and second optical members and the like into the other different shape such as a circular shape or a polygonal shape, and when they are configured with different shapes, the effect totally the same as that of each of the aforementioned embodiments can be obtained.

The present invention is not limited to the aforementioned embodiments, and various modifications and applications can be carried out within the range without departing from the gist of the invention as a matter of course. Further, the above described embodiments include the inventions at the various stages, and various inventions can be extracted by the arbitrary combination of a plurality of disclosed components. For example, even when some components are deleted from all the components shown in the above described one embodiment, if the problem to be solved by the invention can be solved, and the effect of the invention is obtained, the configuration from which the components are deleted can be extracted as the invention. The invention is not limited by a specific embodiment except that the invention is limited by the accompanying claims.

The present invention is not limited to an image pickup apparatus which is an electronic apparatus specialized in the photographing function such as a digital camera, but also can be applied to electronic apparatuses of the other modes including the photographing function, for example, electronic apparatuses with various photographing functions such as a cellular phone, a recording apparatus, an electronic notepad, a personal computer, a game apparatus, a television, a clock, and a navigation apparatus using a GPS (Global Positioning System). Furthermore, the dust reduction system unit in the present invention can be also applied to a projection type image display apparatus or the like which projects an image by using, for example, a transmission type liquid crystal display apparatus or the like.

What is claimed is:

1. An image pickup apparatus, comprising:
an image pickup unit;
a shutter unit located in front and at a subject side of the image pickup unit, the shutter unit comprising a plurality of shutter blades and a main body portion that supports the plurality of shutter blades;
a first optical member disposed at a subject side of the shutter unit, and preventing dust particles from entering the shutter unit;
a second optical member disposed at an image pickup unit side of the shutter unit, and preventing dust particles from entering the shutter unit; and
a vibration applying vibration member disposed at a peripheral edge portion of at least one of the first optical member and the second optical member, at a position outside a region where a subject light transmits;
wherein one of the first optical member and the second optical member is fixedly disposed on the main body portion so as to prevent dust particles from entering the shutter unit;
wherein the other of the first optical member and the second optical member is supported by a first elastic member disposed on the main body portion; and
wherein an enclosed space is formed by the main body portion of the shutter unit, the first elastic member, the first optical member, and the second optical member.

2. The image pickup apparatus according to claim 1, wherein when the vibration applying vibration member is disposed only on the second optical member:
the first optical member is fixedly disposed on the main body portion so as to prevent dust particles from entering the main body portion;
the second optical member is sandwiched between the first elastic member disposed at the shutter unit and a second elastic member disposed on the image pickup unit at a position opposed to the first elastic member; and the second elastic member supports the second optical member and prevents dust particles from entering between the second optical member and the image pickup unit.

3. The image pickup apparatus according to claim 2, wherein the vibration applying vibration member is disposed on a surface of the second optical member at a side opposed to the main body portion.

4. The image pickup apparatus according to claim 1, wherein the shutter unit further comprises an adhesive member to which dust particles generated from the plurality of shutter blades are adhered.

5. An image pickup apparatus comprising:

an image pickup unit;

a shutter unit located in front and at a subject side of the image pickup unit, the shutter unit comprising a plurality of shutter blades and a main body portion that supports the plurality of shutter blades;

a first optical member disposed at a subject side of the shutter unit, and pressed and fixed to the shutter unit via a first elastic member;

a second optical member disposed at an image pickup unit side of the shutter unit, and pressed and fixed to the shutter unit via a second elastic member;

a first vibration applying vibration member disposed at a peripheral edge portion of the first optical member at a position outside a region where a subject light transmits; and a second vibration applying vibration member disposed at a peripheral edge portion of the second optical member at a position outside a region where the subject light transmits;

wherein an enclosed space is formed by the main body portion of the shutter unit, the first elastic member, the second elastic member, the first optical member, and the second optical member.

6. The image pickup apparatus according to claim 5, wherein:

the second optical member is sandwiched between the second elastic member disposed on the shutter unit, and a third elastic member disposed on the image pickup unit at a position opposed to the second elastic member; and the third elastic member supports the second optical member and prevents dust particles from entering between the second optical member and the image pickup unit.

7. The image pickup apparatus according to claim 5, wherein the first vibration applying vibration member and the second vibration applying vibration member are respectively disposed on surfaces of the first optical member and the second optical member at sides opposed to the main body portion.

8. The image pickup apparatus according to claim 5, wherein the shutter unit comprises a plurality of shutter blades and an adhesive member to which dust particles generated from the plurality of shutter blades are adhered.

* * * * *